United States Patent [19]

Suzuki et al.

[11] Patent Number: 5,018,817
[45] Date of Patent: May 28, 1991

[54] METHOD OF OPTICALLY COUPLING OPTICAL FIBER TO WAVEGUIDE ON SUBSTRATE, AND OPTICAL DEVICE PRODUCED BY THE METHOD

[75] Inventors: Makoto Suzuki; Satoshi Watanabe; Takashi Tsukamoto, all of Nagoya; Hikoharu Aoki, Aichi; Hitomi Ohri; Yukihiro Sako, both of Nagoya, all of Japan

[73] Assignee: Brother Kogyo Kabushiki Kaisha, Aichi, Japan

[21] Appl. No.: 447,421

[22] Filed: Dec. 7, 1989

Related U.S. Application Data

[62] Division of Ser. No. 222,427, Jul. 21, 1988, abandoned.

[30] Foreign Application Priority Data

| Jul. 24, 1987 | [JP] | Japan | 62-186038 |
| Jul. 24, 1987 | [JP] | Japan | 62-186039 |
| Jul. 24, 1987 | [JP] | Japan | 62-186040 |
| Jul. 24, 1987 | [JP] | Japan | 62-186041 |
| Jul. 24, 1987 | [JP] | Japan | 62-186042 |

[51] Int. Cl.$^5$ ............................................. G02B 6/30
[52] U.S. Cl. ................................. 350/96.17; 350/96.20
[58] Field of Search ............... 350/96.17, 96.15, 96.20, 350/96.21

[56] References Cited

U.S. PATENT DOCUMENTS

| 4,108,659 | 8/1978 | Dini | 96/27 R |
| 4,598,039 | 7/1986 | Fischer et al. | 430/323 |
| 4,759,595 | 7/1988 | Boord et al. | 350/96.17 |
| 4,765,702 | 8/1988 | Dohan et al. | 350/96.17 |
| 4,877,480 | 10/1989 | Das | 156/635 |

FOREIGN PATENT DOCUMENTS

| 0100409 | 6/1982 | Japan | 350/96.17 |
| 3096608A | 10/1986 | Japan | 350/96.17 |

OTHER PUBLICATIONS d'Auria et al.; "High Index Microlenses for GaAlAs Laser-Fibre Coupling"; *Electronics Letters;* vol. 16, No. 9; Apr. 1980; pp. 322-324.

Primary Examiner—William L. Sikes
Assistant Examiner—Robert E. Wise
Attorney, Agent, or Firm—Oliff & Berridge

[57] ABSTRACT

A method of optically coupling one end of an optical fiber to a waveguide formed on a substrate, such that an end portion of the fiber is fitted in a groove formed in the substrate. The groove is formed by forming a beam-shielding mask having a cutout, on the substrate such that the cutout is aligned with a part of the substrate in which the groove is formed, and by irradiating the above-indicated part of the substrate with a high-energy beam. Alternatively, the groove is formed by a cutting tool. An inclined end surface of the groove left uncut by the tool may be irradiated with a high-energy beam, through a beam-shielding mask which has a cutout aligned with the inclined end surface. The end of the optical fiber, which has a flat face or has a coned or hemi-spherical shape, is positioned for optical coupling with a portion of the waveguide which is exposed to the groove.

8 Claims, 10 Drawing Sheets

METHOD OF OPTICALLY COUPLING OPTICAL FIBER TO WAVEGUIDE ON SUBSTRATE, AND OPTICAL DEVICE PRODUCED BY THE METHOD

This is a division of application Ser. No. 07/222,427 filed July 21, 1988, now abandoned.

BACKGROUND OF THE INVENTION

1. Field of the Invention

The present invention relates to a method of optically coupling an optical fiber to a waveguide formed on a substrate, and an optical device which includes the substrate whose waveguide is coupled to the optical fiber.

2. Discussion of the Prior Art

In recent years, interest in the field of opto-electronics has been much enhanced, by the development of various optical integrated circuits and solid optical deflectors, which include optical elements such as light-emitting elements, light converging elements, optical deflector elements, optical amplifier elements or light-sensitive elements. Generally, such optical elements are integrated on a suitable substrate which is formed with an optical waveguide for guiding a light beam therethrough.

On the other hand, optical information or signal in the form of a light beam is transmitted to or from the waveguide of the substrate, through an optical fiber or fibers. To this end, the optical fiber is optically coupled to the waveguide. However, methods presently available for optically coupling the optical fiber to the waveguide of the substrate suffer from various problems. Some known methods will be described by reference to FIGS. 20-22.

Figure 20:
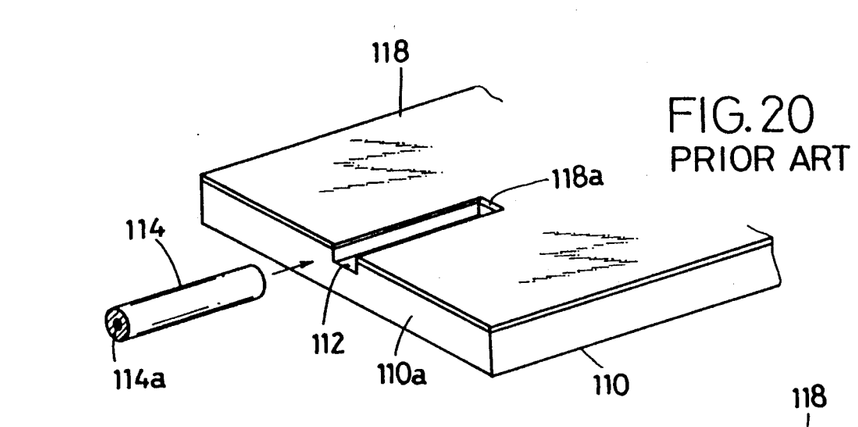
FIG. 20 is a perspective view illustrating a known method of optically coupling an optical fiber to an optical IC substrate, by forming a groove in the substrate.

A first known method is shown in FIG. 20, wherein a suitably sized rectangular groove 112 is formed in one of opposite major surfaces of an optical IC substrate 110, such that the groove 112 is open at an end face 110a of the substrate 110. An end portion of an optical fiber 114 is positioned in the groove 112 and secured therein with a suitable bonding agent such as an ultraviolet-curable resin. Thus, the optical fiber 114 is connected to the substrate 110. This method is advantageous in that the end of a core 114a of the optical fiber 114 may be accurately positioned with respect to an exposed portion 118a of a waveguide 118 which is exposed to the inner or closed end portion of the groove 112. However, since the substrate 110 is formed of a relatively brittle material such as a glass and lithium niobate, which is hard to machine, it is generally difficult to form the groove 112 by machining. In other words, the substrate tends to easily crack or chip during a machining operation to form the groove 112, and consequently the ratio of reject of the substrate is comparatively high.

Figure 21:
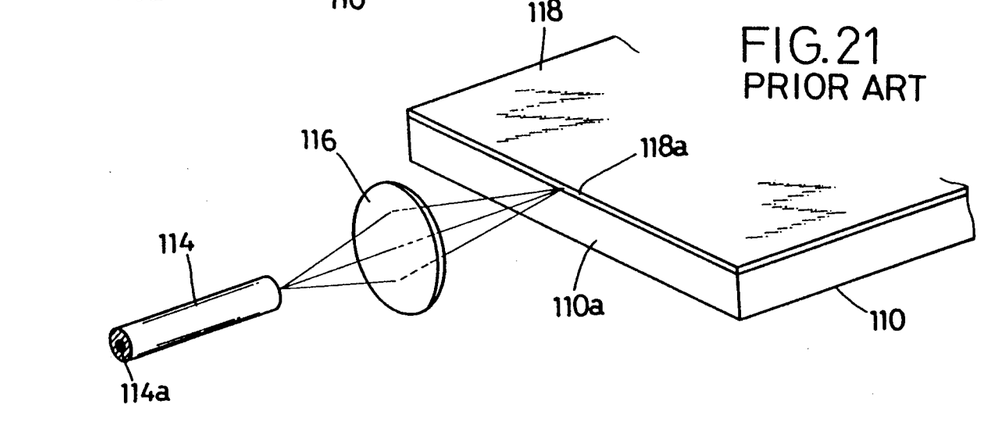
FIG. 21 is a perspective view showing another known method for optical coupling of the optical fiber and the substrate, by using a converging lens so that an input light beam is incident upon the substrate.

There is shown in FIG. 21 a second known method in which a light beam transmitted through the optical fiber 114 is converged by a converging lens 116, so that the converged light beam is incident upon the ground end face 118a of the waveguide 118 on the substrate 110. This method using the converging lens 116 leads to a relatively large-sized optical device, a relatively high cost of manufacture of the device. Further, the optical device suffers from difficulty in establishing alignment of the optical axis.

Figure 22:
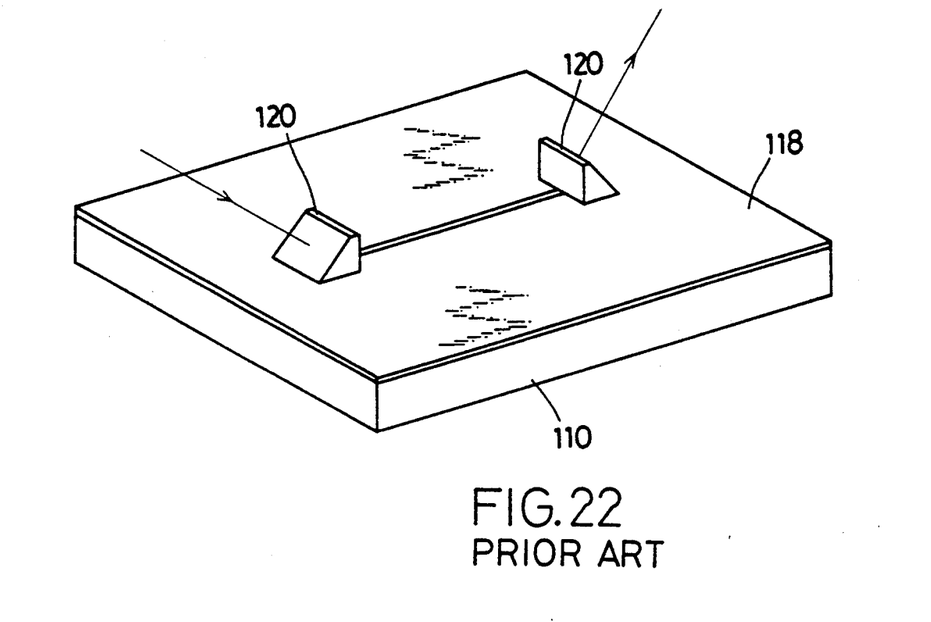
FIG. 22 is a perspective view of a further known method wherein input and output light beams are received by and emitted from respective rutile prisms provided on the substrate.

A third known method is illustrated in FIG. 22, wherein two rutile prisms 120, 120 consisting of titanium oxide (TiO$_2$) are formed on the substrate 110 such that the rutile prisms 120 are optically coupled to the waveguide 118. An input light beam incident upon the input side prism 120 is directed to a predetermined point along the length of the waveguide 118. The light beam travelling through the waveguide 118 is incident upon the output side prism 120, from which the beam is emitted as an output light beam from the substrate. The present method is not economically justified because of a relatively high cost of the rutile prisms 120. Further, the prisms 120 protrude from the surface of the substrate 110, increasing a required space for the optical device, and complicating the optical system involved.

Also known is a method wherein a diffraction grating such as a Fresnel lens is formed in the waveguide of the substrate, so that the grating lens serves to convert an incident plane wave into a cylindrical wave by means of diffraction. However, this method is difficult to practice, requiring complicated process steps and resulting in a considerably high cost of manufacture of the optical device. Moreover, the optical device produced has a high degree of dependence upon the wavelength of a light beam, and the alignment of the optical axis is difficult.

There exists a recognized problem that the cracking or chipping of the substrate during a machining operation to form the groove 112, and light dispersion at an optical interface between the end of the optical fiber and the end face of the groove 112 cause a significant loss of optical energy. In view of this problem, a method of forming a groove in the substrate is proposed according to Japanese Patent Application No. 61-288331 filed in the name of the assignee of the present application. In this method, a cutting tool having a pyramidal cutting tip is moved along the groove to be formed in the substrate, while the tool is rotated about its axis. This cutting procedure permits the groove to be readily cut over a desired length, without the conventionally encountered chipping of the substrate, even where the substrate is made of a brittle material such as a glass or lithium niobate. Since the cutting tip has a pyramidal shape, however, the formed groove has an inclined end face at the closed end, at which the cutting motion of the tool is terminated. Therefore, if the end face of the optical fiber to be coupled to the substrate is perpendicular to the length of the fiber, there is left a gap indicated at S in FIG. 9, between the flat end face of the fiber and an exposed face of the waveguide which is exposed to the closed end of the groove. This gap S causes dispersion of the light emitted from the fiber, whereby the optical transmission efficiency is accordingly reduced.

SUMMARY OF THE INVENTION

It is therefore a first object of the present invention to provide a method of optically coupling an optical fiber to a waveguide of a substrate, which permits easy formation of a groove in the substrate, even where the material of the substrate is relatively brittle.

A second object of the invention is to provide a method of optically coupling an optical fiber to a waveguide of a substrate, with a minimum loss of optical energy at the optical interface between the fiber and the waveguide.

The above objects may be achieved according to one aspect of the present invention, which provides a method of optically coupling one end of an optical fiber to a waveguide formed on a substrate, such that an end portion of the optical fiber which includes the one end is fitted in a groove formed in the substrate, comprising the steps of: forming a mask having a cutout therein, on a surface of the substrate, such that the cutout is aligned with a first part of the surface of the substrate in which the groove is to be formed, the mask being formed of a material capable of protecting a second part of the surface of the substrate which is covered by the mask, from exposure to a high-energy beam; and irradiating the first part of the surface of the substrate with the high-energy beam, and thereby forming the groove in the first part.

According to the method of the invention described above, the groove is formed in the selected part of the substrate which corresponds in shape and dimensions to the cutout of the mask, through which the selected part is irradiated with the high-energy beam. In the instant method, the groove in which the end portion of the optical fiber is fitted can be readily and efficiently formed, yet with high precision. Further, since the optical energy produces a relatively small amount of heat upon irradiation of the substrate, the influence of the heat produced by the high-energy beam on the substrate is accordingly small. Rather, the heat produced by the high-energy beam irradiation contributes to eliminating the internal residual stress of the substrate.

In one form of the instant method of the invention, prior to the formation of the mask, a buffer layer is formed on a third part of the surface of the substrate within which the mask is formed. Alternatively, the mask is removed after the first part of the substrate surface is irradiated with the beam. In this latter case, the removal of the mask prevents otherwise occurring absorption of a light beam by the metal of the mask while the light beam is travelling through the waveguide. In the former case wherein the mask is formed on the buffer layer, the buffer layer prevents the metal of the mask from absorbing the light beam travelling through the waveguide. However, the mask may be removed from the buffer layer.

A laser beam produced by a $CO_2$ (carbon dioxide) laser source may be preferably used as the high-energy beam, since this laser beam has a comparatively high energy. The mask may consist of a thin film of a metal such as gold, aluminum and silver, which has a high reflectance of light with respect to the laser beam. Alternatively, the mask may consist of a thin film of a non-metallic material which has a reflectance of light sufficient to reflect the high-energy beam.

The objects of the invention indicated above may also be achieved according to another aspect of the invention, which provides a method of optically coupling one end of an optical fiber to a waveguide formed on a substrate, such that an end portion of the optical fiber which includes the one end is fitted in a groove formed in the substrate, comprising the steps of: forming in a surface of the substrate a recessed portion as the groove, the recessed portion having a pair of opposed elongate side surfaces which generally define a V shape in transverse cross section, and an inclined end surface which is inclined such that a length of the side surfaces as measured at a bottom of the recessed portion is smaller than that as measured at the surface of the substrate; forming the above-indicated one end of the optical fiber into a coned shape or a hemi-spherical shape; and fixing the end portion of the optical fiber in the recessed portion such that the coned or hemi-spherical end of the optical fiber is positioned for optical coupling with an exposed portion of the waveguide exposed to the recessed portion.

According to the coupling method described above, the end portion of the optical fiber is secured in the recessed portion such that the coned or hemi-spherical end of the fiber is held in contact or substantially in contact with the exposed portion of the waveguide. Accordingly, there exists substantially no gap between the end of the optical fiber and the exposed portion of the waveguide which is exposed to the inclined end surface of the recessed portion. Consequently, the light transmission efficiency of the optical device is improved. Further, since the pair of opposed elongate side surfaces define a V groove, the end portion of the optical fiber can be accurately positioned by the V groove, for alignment of the centerline of the fiber with the waveguide, by simply placing the end portion of the fiber in the V groove of the recessed portion.

In one form of the method according to the second aspect of the invention described above, the recessed portion is formed by moving a cutting tool having a pyramidal cutting tip, in one direction relative to the substrate, while rotating the cutting tool about an axis thereof, such that an end of the cutting tip is finally aligned with the bottom of the recessed portion.

In another form of the method of the same aspect of the invention, the above-indicated one end of the optical fiber is formed into the coned shape, by holding the end of the optical fiber in contact with a grinding surface of a rotating grinding wheel, at a predetermined angle with respect to the grinding surface, while rotating the optical fiber about a centerline thereof. Alternatively, the end of the optical fiber may be formed into the hemi-spherical shape, by fusing the end of the optical fiber by subjecting it to an electric arc.

The optical fiber may be fixed in the recessed portion by securing the above-indicated one end portion to the substrate with a resin which is curable by exposure to a ultraviolet radiation.

The substrate may be preferably formed of lithium niobate, and the waveguide consists of a predetermined portion of a thickness of the substrate adjacent to the surface, which has a higher refractive index than the other portion of the thickness of the substrate.

In a further form of the method of the same aspect of the invention, the recessed portion is formed by moving a cutting tool having a pyramidal cutting tip, relative to the substrate, along an arc in a plane perpendicular to the surface of the substrate, while rotating the cutting tool about an axis thereof, such that the bottom of the recessed portion is downwardly curved as viewed in a longitudinal cross section parallel to the plane. In this case, the recessed portion may be formed in a desired portion of the substrate, other than the portions which include the periphery of the substrate. Namely, the recessed portion needs not be open to an end face of the substrate. This indicates that the optical fiber may be easily and economically coupled to the waveguide, at a desired position on the substrate, and the freedom of design of the optical device such as an optical integrated circuit is significantly increased.

The objects of the invention may also be accomplished according to a further aspect of the invention, which provides a method of optically coupling one end of an optical fiber to a waveguide formed on a substrate, such that an end portion of the optical fiber which includes the above-indicated one end is fitted in a groove formed in the substrate, comprising the steps of: forming in a surface of the substrate a generally elongate recessed portion formed as the groove, the generally elongate recessed portion having an inclined end surface; forming a mask having a cutout therein, on the substrate such that the cutout is aligned with the inclined end surface of the recessed portion, the mask being formed of a material capable of protecting a part of the surface of the substrate which is covered by the mask, from exposure to a high-energy beam; and irradiating the inclined end surface of the recessed portion with the high-energy beam, and thereby forming an end portion of the recessed portion which has a substantially flat end face substantially perpendicular to the surface of the substrate.

According to this method, the flat end face of the optical fiber may be readily positioned in contact with the substantially flat end face of the end portion of the recessed portion, whereby the light transmission efficiency is enhanced. Since the optical energy produces a relatively small amount of heat upon irradiation of the substrate, the influence of the heat produced by the high-energy beam on the substrate is accordingly small, but the produced heat contributes to eliminating the internal residual stress of the substrate.

As described above with respect to the first aspect of the invention, the above method may further comprise at least one of the following steps: before forming the mask, forming a buffer layer on a part of the surface of the substrate within which the mask is formed; and after irradiating the inclined end surface, removing the mask. If the mask is removed, otherwise occurring absorption of a light beam by the metal of the mask is avoided. If the mask is formed on the buffer layer, the buffer layer prevents the metal of the mask from absorbing the light beam travelling through the waveguide.

In the instant method, too, a laser beam produced by a $CO_2$ (carbon dioxide) laser source may be preferably used as the high-energy beam. The mask may consist of a thin film of a metal such as gold, aluminum and silver, which has a high reflectance of light with respect to the laser beam. Alternatively, the mask may consist of a thin film of a non-metallic material which has a reflectance of light sufficient to reflect the high-energy beam.

According to the present invention, there is also provided an optical device comprising: a substrate having a waveguide on a surface thereof; an optical fiber which is optically coupled at one end thereof to the waveguide, the above-indicated one end of the optical fiber having a flat end face; the substrate having a generally elongate groove formed therein by exposure to a high-energy beam, the generally elongate groove having a substantially flat end face substantially perpendicular to the surface of the substrate; and fixing means for fixing an end portion of the optical fiber including the substantially flat end face, in the generally elongate groove, such that the substantially flat end face is positioned for optical coupling with an exposed portion of the waveguide exposed to the recessed portion.

Also provided according to the invention is an optical device comprising: a substrate having a waveguide on a surface thereof; an optical fiber which is optically coupled at one end thereof to the waveguide, the above-indicated one end of the optical fiber having a coned or hemi-spherical shape; the substrate having a recessed portion formed therein, the recessed portion having a pair of opposed elongate side surfaces which generally define a V shape in transverse cross section, and an inclined end surface which is inclined such that a length of the side surfaces as measured at a bottom of the recessed portion is smaller than that as measured at the surface of the substrate; and fixing means for fixing an end portion of the optical fiber including the above-indicated one end, in the recessed portion, such that the coned or hemi-spherical one end is positioned for optical coupling with an exposed portion of the waveguide exposed to the recessed portion.

There is also provided according to the invention an optical device, comprising: a substrate having a waveguide on a surface thereof; an optical fiber which is optically coupled at one end thereof to the waveguide, the above-indicated one end of the optical fiber having a substantially flat end face; the substrate having a generally elongate groove formed therein, the generally elongate groove including an end portion which has a substantially flat end face substantially perpendicular to the surface of the substrate, the end portion of the generally elongate groove being formed by exposure to a high-energy beam; and fixing means for fixing an end portion of the optical fiber including the substantially flat end face, in the generally elongate groove, such that the substantially flat end face is positioned for optical coupling with an exposed portion of the waveguide exposed to the recessed portion.

BRIEF DESCRIPTION OF THE DRAWINGS

The above and other objects, features and advantages of the present invention will become more apparent by reading the following detailed description of presently preferred embodiments of the invention, when considered in connection with the accompanying drawings, in which.

DETAILED DESCRIPTION OF THE PREFERRED EMBODIMENTS

Figure 1:
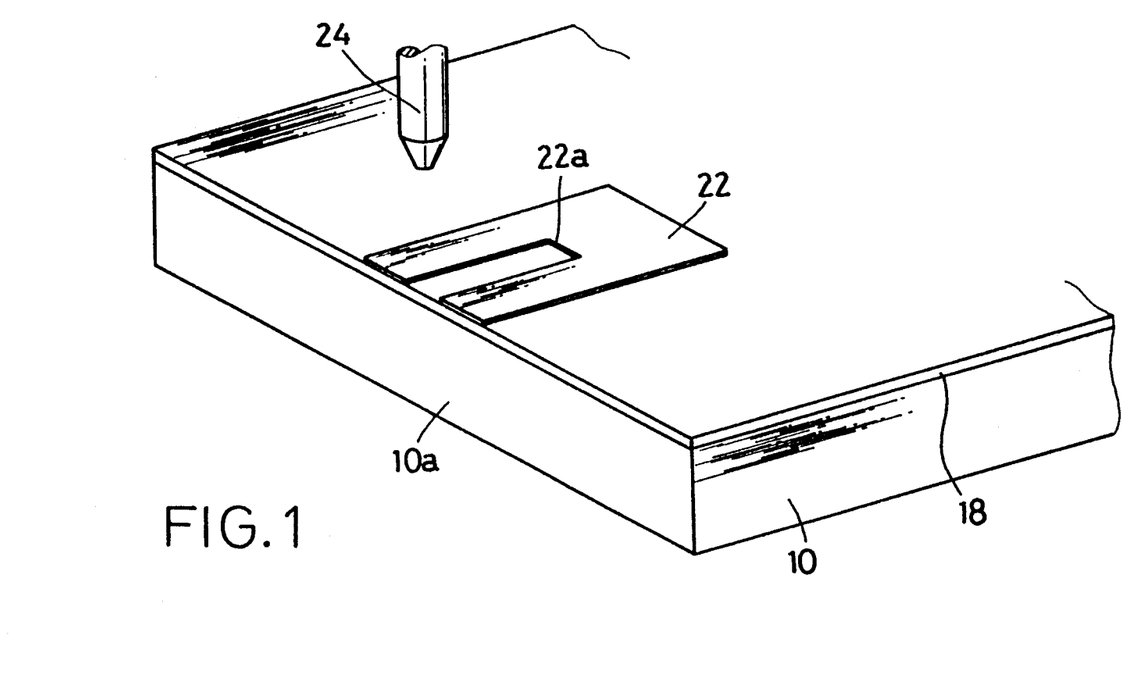
FIG. 1 is a perspective view showing a manner of forming a groove in a substrate, according to one embodiment of a method of the present invention.
Figure 2:
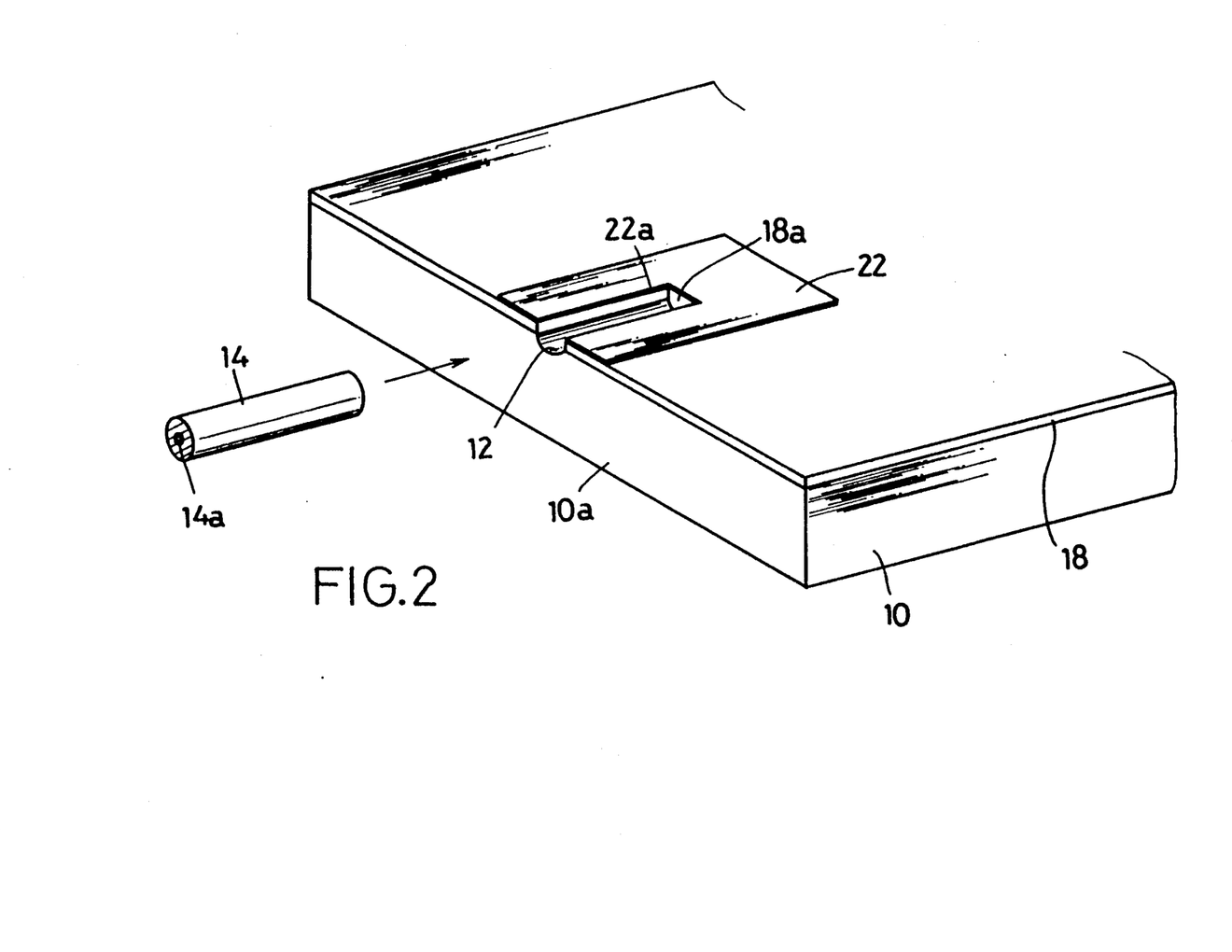
FIG. 2 is a perspective view of the substrate in which the groove is formed in the manner shown in FIG. 1.

Referring first to FIGS. 1 and 2, there is shown one method of forming a groove 12 in a substrate 10 which is formed of a relatively brittle material. In the present method, the groove 12 is formed by utilizing a $CO_2$ laser beam which has a wavelength of 10.6 microns. However, other high-energy beams such as a plasma arc or electric arc may be used as needed, provided that such high-energy beams are capable of machining a highly brittle material such as a glass material or a crystal of lithium niobate ($LiNbO_3$). The substrate 10 has a two-dimensional waveguide 18, which is formed by diffusion of a suitable material such as titanium into a thickness portion of the substrate adjacent to its surface. The substrate 10 is employed as a base for various optical elements such as an optical integrated circuit or a solid optical deflector.

In the present specific example, the substrate 10 formed of lithium niobate ($LiNbO_3$) is exposed to the $CO_2$ laser beam, through a patterned mask 22 formed on one of the opposite major surfaces of the substrate 10. The mask 22 which is formed of a material capable of withstanding the laser beam, i.e., capable of protecting a part of the substrate 10 covered by the mask 22, from an influence of the $CO_2$ laser beam. For example, the mask 22 preferably consists of a thin film of a metal such as aluminum (Al) having a thickness of about 15 microns. The mask 22 is formed with a rectangular cutout 22a which is shaped and dimensioned so as to accommodate the end portion of the optical fiber 14. In other words, the cutout 22a is aligned with a part of the surface of the substrate 10 in which the rectangular groove 12 is to be formed such that the groove 12 is open, at one of its longitudinal ends, on an end face 10a of the substrate 10, and is closed at the other end. The mask 22 is formed by a suitable thin-film forming technique, such as sputtering and vacuum vapor deposition, depending upon the dimensions and material of the substrate 10.

The substrate 10 on which the patterned mask 22 is formed as described above is then placed on an X-Y table which is movable in a two-dimensional coordinate plane, i.e., along an X axis and a Y axis that are perpendicular to each other. Above the X-Y table, there is provided a machining head 24 of a $CO_2$ (carbon dioxide) laser generator (not shown).

To form the rectangular groove 12, the $CO_2$ laser generator is activated so that a $CO_2$ laser beam is emitted from the machining head 24 toward the substrate 10, in the direction perpendicular to the surface of the substrate 10. Thus, the area including the patterned mask 22 is irradiated with the laser beam. With the laser beam generated, the X-Y table is moved along the X and Y axes so that the patterned mask 22 is scanned or swept by the laser beam from the machining head 24. Described more specifically, the laser beam is reflected by the surface of the mask 22, whereby the part of the surface of the substrate 10 which is covered by the mask 22 is not exposed to the laser beam and is not machined at all. On the other hand, the area of the substrate surface which is exposed through the rectangular cutout 22a of the mask 22 is irradiated with the laser beam, whereby a given thickness portion of the substrate in the exposed area aligned with the cutout 22a is instantaneously evaporated with a high energy of the $CO_2$ laser beam. As a result, the rectangular groove 12 corresponding to the rectangular cutout 22a of the patterned mask 22 is formed in the end portion of the substrate 10, such that the groove 12 is open at its one end on the end face 10a of the substrate 10, and is closed at the other end on the inner side of the substrate 10, as indicated in FIG. 2. With the groove 12 formed, a portion of the waveguide 18 is exposed to the closed end of the groove 12, as indicated at 18a in FIG. 2. The machining conditions with the laser beam are indicated in Table 1 below.

TABLE 1

| Laser | $CO_2$ (wavelength: 10.6 microns) |
| --- | --- |
| Oscillator type | Pulsing type |
| Output | 130 W (on continuous output basis) |
| Frequency | 100 Hz |
| Duty cycle | 1% |
| X-Y table feed rate | 0.5 m/min. |

The depth of the groove 12 to be formed can be adjusted by controlling the output of the $CO_2$ laser generator. It is advantageous that the depth of the groove 12 be larger than the diameter of the optical fiber 14 so that the position of the fiber 14 in the direction of depth of the groove 12 is adjustable so as to maximize the amount of a light beam which is transmitted from the fiber 14 to the waveguide 18.

After the groove 12 is formed in the substrate 10, the mask 22 is removed in a suitable manner, for example, by etching, in order to prevent the metal film (aluminum film) of the mask 22 from partially absorbing the light energy and attenuating the light beam while the light beam travels through the waveguide 18. Then, the end portion of the optical fiber 14 is fitted in the formed groove 12 such that the flat end face of the fiber 14 is suitably aligned with the exposed end portion 18a of the waveguide 18. More particularly, the position of the end portion of the fiber 14 is adjusted in the direction of depth of the groove 12 so that the amount of the light beam which is emitted from a core 14a of the fiber 14 and received by the waveguide 18 is maximized. With the end portion of the fiber 14 properly positioned with respect to the exposed portion 18a of the waveguide 18, the same end portion of the fiber 14 is secured to the substrate 10 with a suitable resin, for instance, a resin which is curable by a ultraviolet radiation. While the illustrated waveguide 18 is a two-dimensional waveguide, the method of forming the groove 12 is equally applicable to the substrate 10 which is provided with a three-dimensional waveguide.

Although the patterned mask 22 formed on the substrate 10 in the illustrated example consists of a metal film such as an aluminum thin film, other materials such as gold (Au) and silver (Ag) may be used for the mask 22, provided these materials are capable of reflecting the high-energy beam, i.e., capable of protecting the part of the substrate 10 covered by the mask 22, from the exposure to the beam. Further, if the $CO_2$ laser beam has a wavelength of 10.6 microns as indicated above, the mask 22 may be formed of a non-metallic material such as ceramics, which has a sufficiently high reflectance of light with respect to the wavelength of 10.6 microns. While the substrate 10 is moved by the X-Y table relative to the fixed machining head 24 in the illustrated example, it is possible to move the machining head 24 along the X and Y axes, relative to the fixed substrate 10.

In the illustrated method of forming the groove 12, the part of the surface of the substrate 10 which is covered by the mask 22 is protected from the irradiation with the high-energy $CO_2$ laser beam, while the area exposed through the cutout 22a is irradiated with the laser beam and is machined in a suitable depth corresponding to the energy of the laser beam, with desired configuration and dimensions which are determined by the configuration and dimensions of the cutout 22a formed in the mask 22. Thus, the desired groove 12 can be readily and efficiently formed. Since the mask 22 is deposited on the substrate 10, with the cutout 22a suitably positioned in alignment with the area in which the groove 12 is to be formed, no cumbersome procedure is necessary to place, position and fix a masking plate on the substrate 10 upon irradiation of the substrate 10 with a high-energy beam. Further, since the amount of heat produced in the substrate 10 by the high-energy beam is relatively small, the influence of the heat on the irradiated area of the substrate 10 is kept to a minimum. Rather, the heat produced provides an advantageous effect of eliminating the residual internal stress of the substrate 10.

Figure 3:
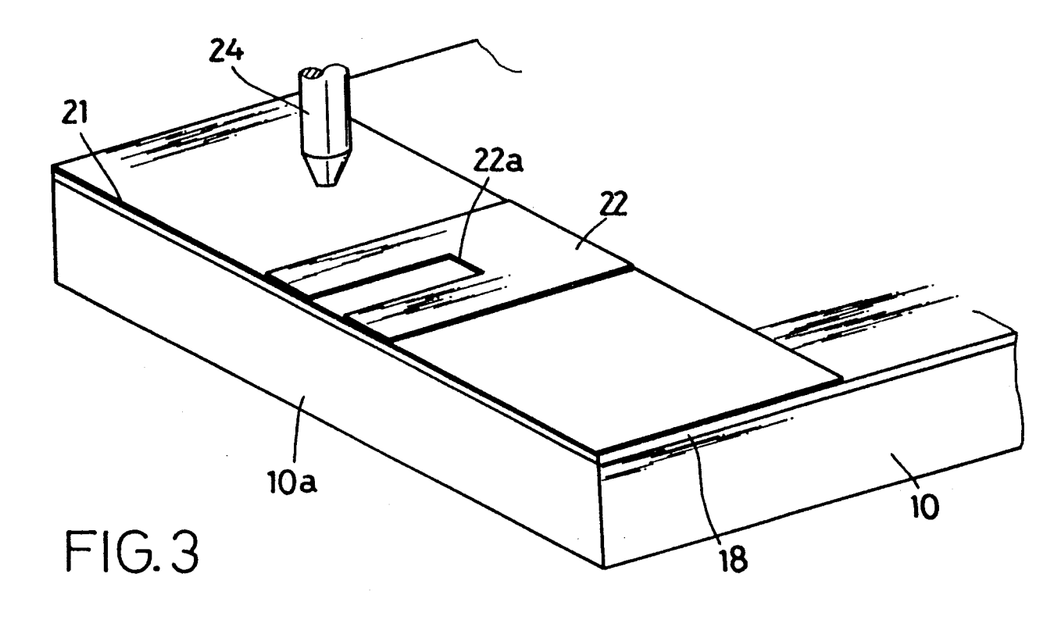
FIGS. 3 and 4 are perspective views corresponding to those of FIGS. 1 and 2, showing another embodiment of the present invention.
Figure 4:
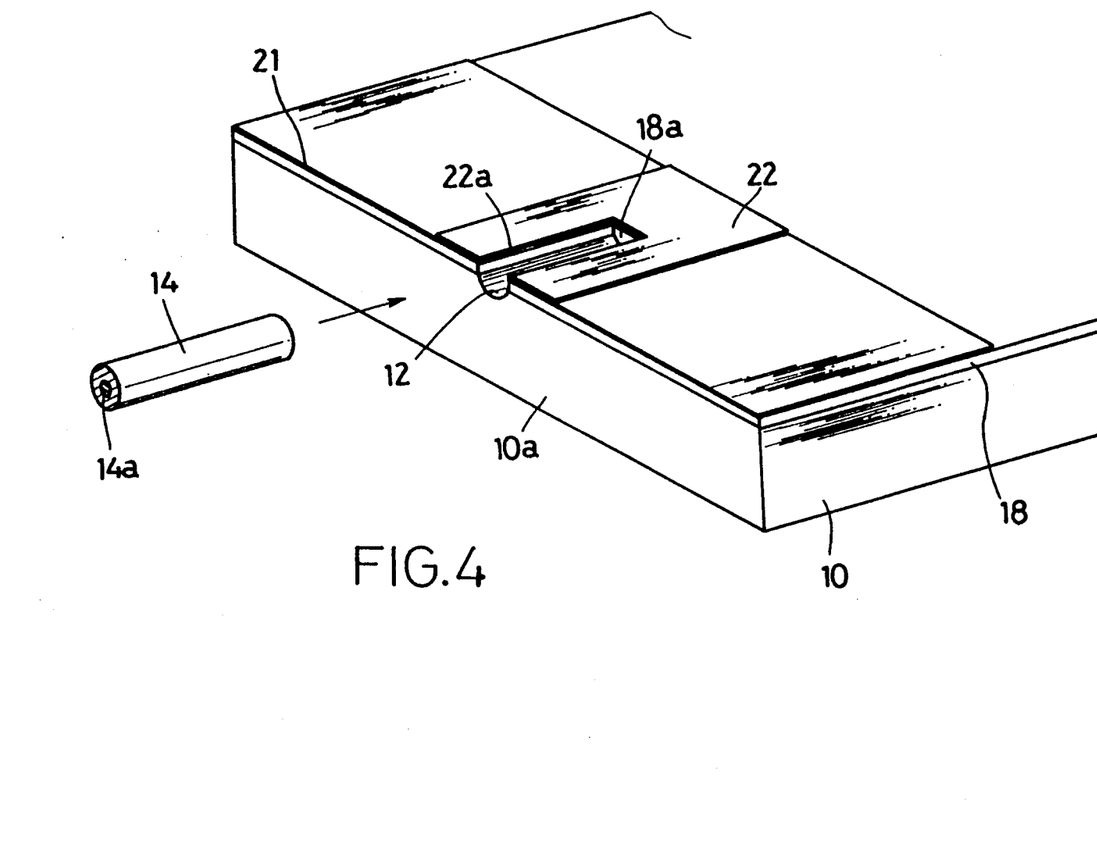

Referring next to FIGS. 3 and 4, another embodiment of the present invention will be described. In the interest of brevity and simplification, the same reference numerals as used in the preceding embodiment will be used to identify the corresponding elements, and redundant description of these elements will not be provided.

In this embodiment, a buffer layer 21 is formed on a part of the surface of the $LiNbO_3$ substrate 10 within which the patterned mask 22 is formed after the layer 21 is formed, as indicated in FIG. 3. The buffer layer 21, which separates the mask 22 from the substrate 10, is provided to function to avoid absorption of the light energy by the metal film of the mask 22 while the light beam travels through the waveguide 18. For example, the buffer layer 21 formed on the substrate 10 preferably consists of a film of $SiO_2$ which has a thickness of 1000 angstroms. The buffer layer 21 may be formed of alumina ($Al_2O_3$).

Subsequently, the patterned mask 22 is deposited on the selected area of the buffer layer 21, in the same manner as described above. Then, the groove 12 is formed as indicated in FIG. 4, by irradiating the areas of the buffer layer 21 and substrate 10 exposed through the cutout 22a, with the high-energy beam. In the present example, however, it is not necessary to eliminate the mask 22, in the presence of the buffer layer 21 which prevents the undesirable absorption of the optical energy by the mask 22. Where some optical elements are formed on the buffer layer 21, the mask 22 may be removed from the buffer layer 21. In this case, too, the buffer layer 21 serves a similar function.

The present method of forming the groove 12 has the same advantages as described above with respect to the first embodiment. In addition, the instant method eliminates the removal of the mask 22.

Referring further to FIGS. 5-19, there will be described various other embodiments of the invention for optically coupling an end of an optical fiber to a waveguide formed on a substrate. In these figures, the same reference numerals as used in FIGS. 1-4 will be used to identify the corresponding elements.

Figure 5:
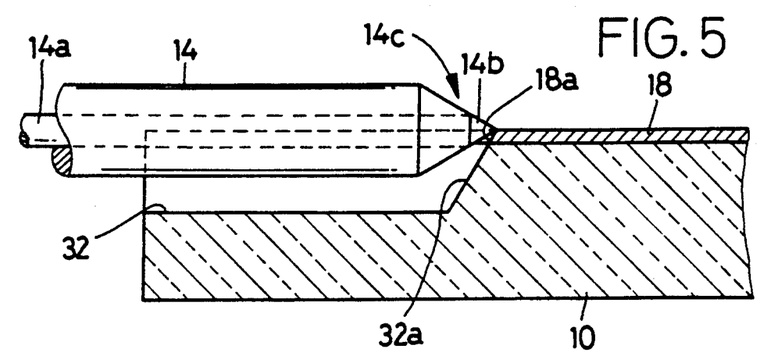
FIG. 5 is an elevational view in longitudinal cross section of a substrate and an end portion of an optical fiber optically coupled to a waveguide of the substrate, according to a further embodiment of the invention.

There is shown in FIG. 5 the substrate 10 of lithium niobate which has a V-groove 32 formed therein according to a method disclosed in Japanese Patent Application No. 61-288331 filed in the name of the assignee of the present application. The V-groove 32 has a V shape in transverse cross section in a plane perpendicular to the plane of FIG. 5. The V-groove 32 is cut by using a cutting tool (as indicated at 43 in FIG. 11, which shows another embodiment of the invention) which has a pyramidal cutting tip formed of a sintered carbide. The cutting tool is moved in the direction of length of the V-groove 32 to be formed, while the tool is rotated about its axis. If necessary, the tool takes two or more passes, until the desired depth of cut is reached. In the final pass, the end of the cutting tip is aligned with the bottom of the V-groove 32 to be formed. As a result, the V-groove 32 is formed with a pair of opposed elongate side surfaces which generally define a V shape in the above-indicated transverse cross section. As indicated in FIG. 5, the closed end of the V-groove 32 is defined by an inclined end surface 32a which is inclined such that a length of the side surfaces as measured at the bottom of the V-groove is smaller than that as measured at the surface of the substrate 10 (waveguide 18). This inclined end surface 32a is formed due to the shape of the pyramidal cutting tip of the cutting tool used. Namely, the inclination of the end surface 32a corresponds to the angle of the pyramidal cutting tip of the tool. Thus, the V-groove 32 is formed without chipping of the substrate 10.

Figure 7:
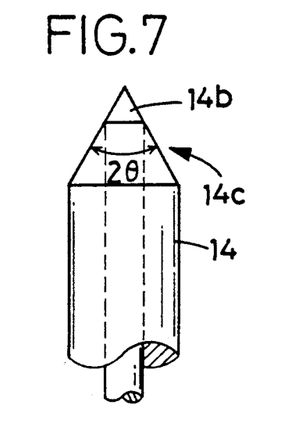
FIG. 7 is a fragmentary enlarged elevational view of an end portion of the optical fiber whose end is shaped in the manner shown in FIG. 6.
Figure 8:
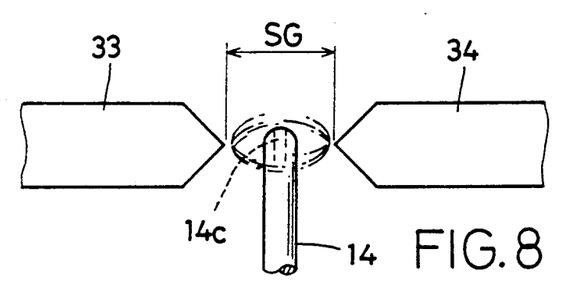
FIG. 8 is an illustration showing a manner in which the end of the optical fiber used in the embodiment of FIG. 5 is hemi-spherically shaped.

In the present embodiment wherein the V-groove 32 is formed in the substrate 10, an end 14c of the optical fiber 14 having a core 14a is formed into a coned shape as indicated in FIG. 7, or a hemi-spherical shape as indicated in FIG. 8. That is, the end portion of the optical fiber 14 is positioned within the V-groove 32 such that an end 14b of the core 14a at the coned or hemi-spherical end 14c of the fiber 14 is held in contact or in substantially contact with the exposed portion 18a of the waveguide 18, which portion 18a is exposed on the inclined end surface 32a of the V-groove 32, as indicated in FIG. 5.

Figure 6:
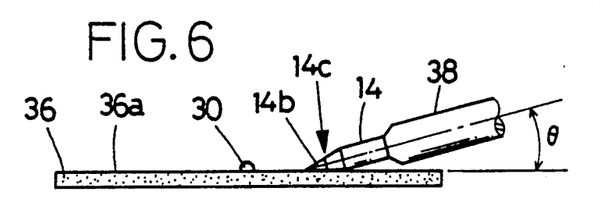
FIG. 6 is an illustration showing a manner of grinding the end of the optical fiber into a conical shape, according to the method of FIG. 5.

FIG. 6 illustrates a manner in which the end 14c of the optical fiber 14 is formed into a coned shape. The fiber 14 is held by a fiber holder 38 in the form of a sheath, such that the end portion extends from the holder 38 by a suitable distance, and such that the end 14c of the fiber 14 is held in contact with a grinding surface 36a of a rotating grinding wheel 36, at a predetermined angle θ. The grinding wheel 36 is fixed to a vertically extending drive shaft 30 and is rotated about the drive shaft 30. The end 14c of the fiber 14 is ground by the grinding surface 36a while the fiber 14 is rotated about its centerline. In this manner, the end 14b of the core 14a of the optical fiber 14 is shaped into a cone which has a taper angle equal to 2θ, as indicated in FIG. 7.

FIG. 8 shows a manner in which the end 14c of the optical fiber 14 is formed into a hemi-spherical shape. Described more specifically, the end portion of the fiber 14 is positioned between a pair of opposed discharge electrodes 33, 34 whose tips are spaced apart from each other by an arc gap SG. With a high voltage applied between the two electrodes 33, 34, an electric arc occurs in the arc gap SG in which the end 14c of the fiber 14 is disposed. As a result, the end 14b of the core 14a of the fiber 14 is fused into a hemi-spherical shape, due to a surface tension of the fused material. The optical fiber 14 having the hemi-spherical end 14c may also be suitably coupled to the waveguide 18 of the substrate 10.

The end portion of the optical fiber 14 whose end 14c is shaped as described above is fitted in the V-groove 32 formed in the substrate 10, such that the coned or hemi-spherical end 14b of the core 14a of the fiber 14 is held in close contact with the exposed portion 18a of the waveguide 18 which is exposed to the inclined end surface 32a of the V-groove 32, as depicted in FIG. 5, by way of example. Therefore, there exists substantially no gap at an optical interface between the end 14b of the core 14a of the fiber 14 and the exposed portion 18a of the waveguide 18, whereby otherwise possible loss of optical energy due to dispersion of the light beam emitted from the core 14a can be effectively avoided according to the instant method of coupling the fiber 14 to the waveguide 18. Namely, the instant method assures improved optical transmission efficiency of the optical device, which includes the fiber 14 and the substrate 10. The thus positioned end portion of the optical fiber 14 fitted in the V-groove 32 is secured to the substrate 10, by using a suitable bonding agent, such as a ultraviolet-curable resin. Since the V-groove 32 has the pair of opposed side surfaces which define a V shape, the end portion of the fiber 14 can be accurately positioned with respect to the waveguide 18, in the direction of depth of the V-groove 32.

It follows from the above description that the methods illustrated in FIGS. 5-8 also permit accurate positioning and fixing of the end portion of the optical fiber 14 in the V-groove 32 formed in the substrate 10, and adequate radial alignment of the end 14c (14b) of the optical fiber 14 with the exposed portion 18a of the waveguide 18 which is exposed on the inclined end surface 32a at the closed end of the V-groove 32, so as to effectively minimize the optical energy loss due to the dispersion of the light beam at the interface between the end 14b of the core 14a of the fiber 14 and the exposed portion 18a of the waveguide. Thus, the instant methods assure enhanced optical transmission efficiency of the optical device.

Figure 9:
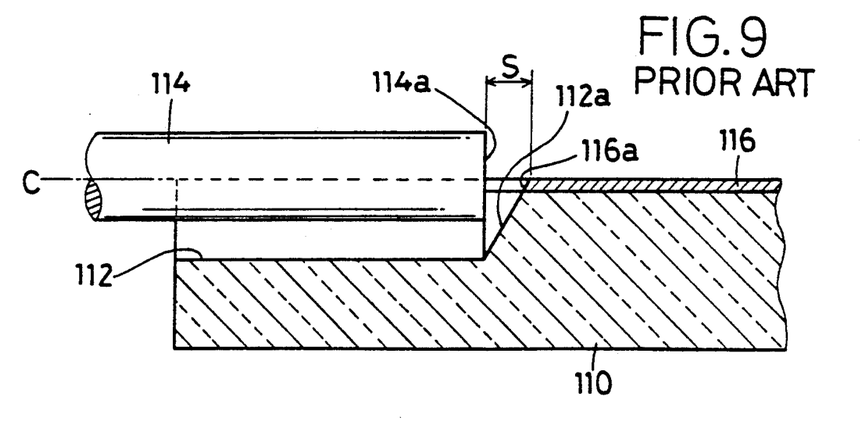
FIG. 9 is an elevational view in longitudinal cross section corresponding to that of FIG. 5, depicting a conventional method of optically coupling the optical fiber to the substrate.

FIG. 9 illustrates a conventional manner method in which a fiber 114 is optically coupled to a waveguide 116 on a substrate 110. Since the fiber 114 has a flat end face 114a, the end portion of the fiber 114 is positioned such that there exists a certain amount of gap S between the end face 114a of the fiber 114 and an exposed portion 116a of the waveguide 116, in the presence of an inclined end surface 112a of a V-groove 112. The gap S results in a considerable degree of dispersion of a light beam emitted from the end face 114a of the optical fiber 114 toward the exposed portion 116a of the waveguide 116.

Figure 10:
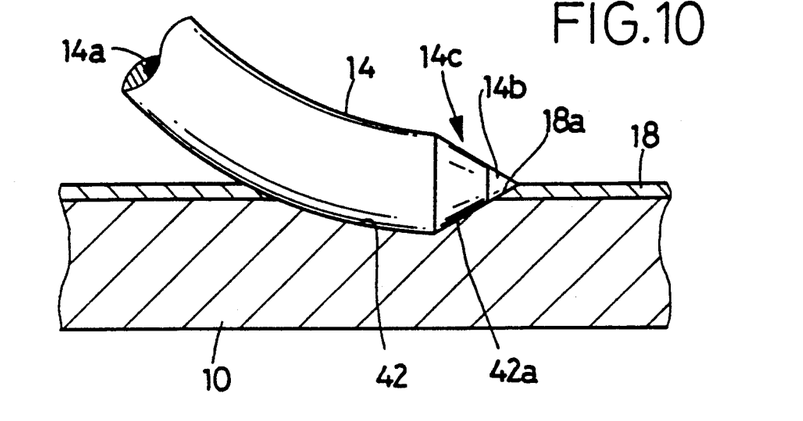
FIG. 10 is an elevational view in longitudinal cross section of a substrate and an optical fiber optically coupled to the substrate according to a still further embodiment of the invention.
Figure 11:
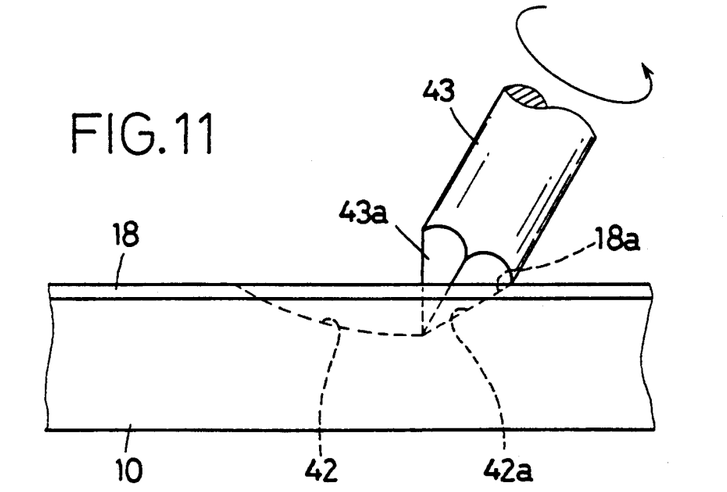
FIG. 11 is an elevational view indicating a manner of cutting in the substrate a groove which has a downwardly curved bottom profile.
Figure 12:
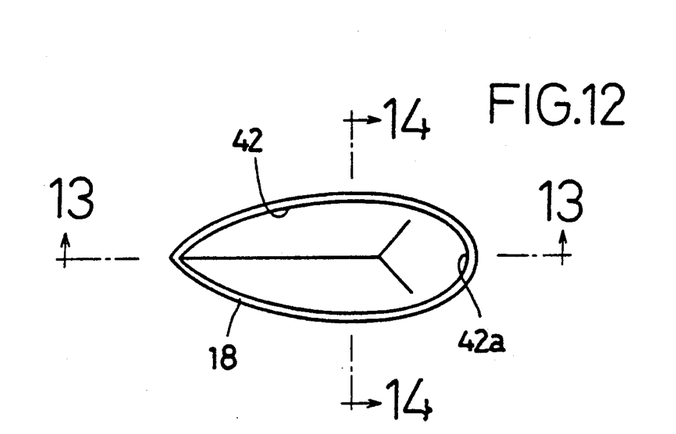
FIG. 12 is a plan view of the groove formed in the manner indicated in FIG. 11.
Figure 13:
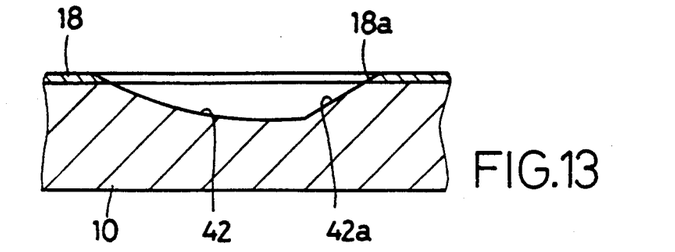
FIG. 13 is an elevational view in longitudinal cross section taken along line 13—13 of FIG. 12.
Figure 14:
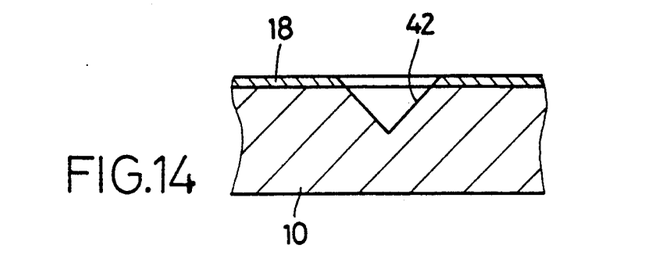
FIG. 14 is an elevational view in transverse cross section taken along line 14—14 of FIG. 12.

A further modified method according to the invention is illustrated in FIGS. 10-15, wherein the glass or lithium niobate substrate 10 is formed with a recessed portion or groove 42. Described in greater detail, the groove 42 has a slightly downwardly curved bottom profile in longitudinal cross section as indicated in FIGS. 10, 11 and 13, and takes the form of a letter V in transverse cross section as indicated in FIG. 14. This groove 42 is cut by a cutting tool 43 which has a pyramidal cutting tip 43a which is formed of a sintered carbide. The cutting tool 43 has a shank diamter of 5 mm, and the cutting tip 43a has a cutting edge angle of 60 degrees. To cut the groove 42, the cutting tool 43 is positioned on the substrate 10, at a desired cutting start point, and is fed two-dimensionally (in a simultaneously two-axis contouring fashion, in the longitudinal and vertical direction of the substrate 10), i.e., along an arc which corresponds to a part of the bottom profile of the groove 42 as indicated in dashed line in FIG. 11. As also indicated in FIG. 11, the cutting tool 43 is fed with its axis inclined a suitable angle with respect to the surface of the substrate. In this specific example, the cutting tool 43 is fed at a feed rate of 1 mm/min., and rotated at 40,000 rpm. Since the substrate 10 is made of a brittle material considerably hard to machine, the cutting tool 43 takes two or more cuts or cutting passes, for example, twelve passes, to obtain a desired depth of cut.

With the suitable number of cutting passes taken by the cutting tool 43, the groove 42 is formed as illustrated in FIGS. 12-15. The transverse cross sectional shape V of the groove 42 corresponds to the corresponding cross sectional shape of the pyramidal cutting tip 43a of the tool 43, and the outer profile as viewed in the plan view of FIG. 12 is similar to the horizontal cross sectional shape of a vessel. Since the feeding action of the cutting tool 43 is terminated at the end of the arc indicated above, the groove 42 is formed with an inclined end surface as indicated at 42a in FIGS. 10-13. The inclination of the inclined end surface 42a formed at one end of the groove 42 is determined by the angle of the cutting edge of the pyramidal cutting tip 43a of the tool 43 and the angle of the inclination of the cutting tool 43, as indicated in FIG. 11. The inclined end surface 42a includes an exposed portion 18a of the waveguide 18. In other words, the exposed portion 18a is exposed on the inclined end surface 42a of the groove 43.

In the thus formed groove 42, the end portion of the optical fiber 14 is positioned in the groove 42, such that the end portion of the fiber 14 is elastically downwardly curved or flexed along the bottom profile of the groove 42, as indicated in FIG. 10. In this embodiment, too, the end 14c of the fiber 14 is formed into a coned or hemi-spherical shape (as illustrated in FIGS. 7 and 8). The coned end 14c is illustrated in FIG. 10, by way of example. The coned or hemi-spherical end 14c of the fiber 14 is held against the inclined end surface 42a of the groove 42, so that the end 14b of the core 14a of the fiber 14 is aligned with the exposed portion 18a of the waveguide 18, as indicated in FIGS. 10 and 15.

With the end portion of the optical fiber 14 positioned in the groove 42 as described above, the same end portion is fixed with a ultraviolet-curable resin or other suitable bonding agent, as described above. The present method also assures high optical transmission efficiency, in the absence of a gap between the end 14b of the core 14a and the exposed portion 18a of the waveguide 18.

Figures 15, 16:
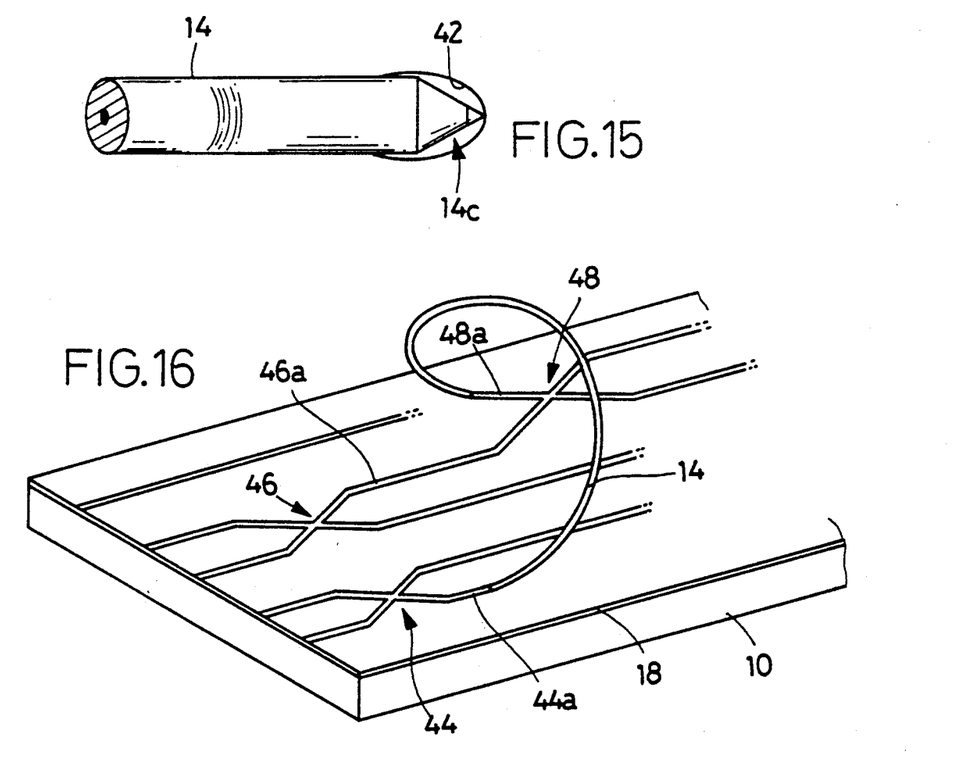
FIG. 15 is a plan view of the end portion of the optical fiber coupled to the substrate of FIG. 10.
FIG. 16 a schematic perspective view showing a substrate which has X-type branching switches formed in a waveguide of the substrate, illustrating one application of the principle of the present invention.

FIG. 16 illustrates an example in which the method shown in FIGS. 10-15 is applied for optical coupling between optical fibers and waveguides. That is, the waveguide 18 of the substrate 10 shown in FIG. 16 is provided with X-type branching switches 44, 46 and 48. Each of the two switches 44, 46 has two output lines 44a, 46a, one of which is connected respective input lines 48a, 48a of the branching switch 48. For instance, the groove 42 shown in FIGS. 10-15 is cut in each of the portions of the waveguide 18 which correspond to the output lines 44a, 46a and the input lines 48a. Thus, the braching switches 44, 46 are optically coupled to the branching switch 48 by the optical fibers 14 whose end portions are fitted in the respective grooves 42 formed in the appropriate portions of the substrate 10.

Since the method illustrated in FIGS. 10-15 permits the grooves 42 to be cut at any desired positions on the substrate 10, other than the peripheral portions (in which the grooves 12 of FIGS. 2 and 4 are formed), the optical fiber 14 can be connected to the desired portions of the waveguide 18, whereby a light beam may be received at or emitted from the desired positions of the substrate 10. Accordingly, the freedom of design of an optical device including the optical fiber 14 and substrate 10 is significantly increased.

Figure 17:
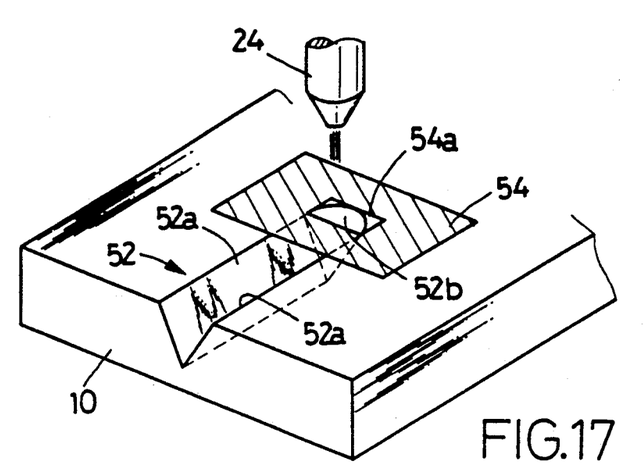
FIG. 17 is a perpsective view showing a manner of forming a groove in a brittle substrate, according to a yet further embodiment of the present invention.
Figure 18:
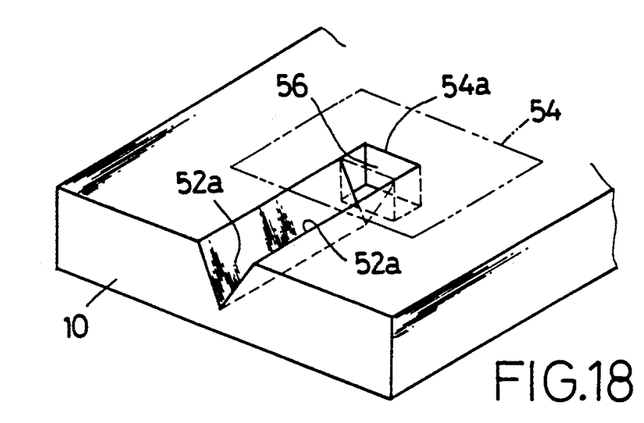
FIG. 18 is a perspective view of the substrate in which the groove is formed according to the method of FIG. 17.
Figure 19:
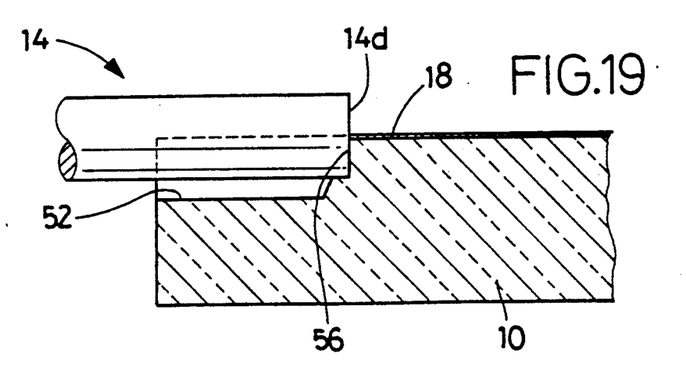
FIG. 19 is an elevational view in longitudinal cross section of the substrate of FIG. 18, and an end portion of an optical fiber fitted in the groove in the substrate.

A further embodiment of the invention is illustrated in FIGS. 17-19, wherein a V-groove 52 similar to the V-groove 32 shown in FIG. 5 is formed in the glass or $LiNbO_3$ substrate 10, by using a cutting tool having a pyramidal cutting tip, as used in the embodiment of FIGS. 10-15. The manner of cutting the V-groove 52 is similar to that described with respect to the V-groove 32. The V-groove 52 has a pair of opposed elongate rectangular side surfaces 52a, 52a which define a V shape. The closed end of the V-groove 52 is defined by an inclined end surface 52b similar to the surface 32a shown in FIG. 5.

A patterned mask 54 is formed on a part of the surface of the substrate 10 which includes an area in which the inclined end surface 52b is formed. The mask 54 is formed of aluminum or other suitable material which is capable of reflecting a high-energy beam such as a $CO_2$ laser beam, as described above with respect to the embodiment of FIGS. 1 and 2. The mask 54 has a rectangular cutout 54a which is aligned with an end portion of the V-groove 52 which includes the inclined end surface 52b.

The substrate 10 with the V-groove 52 and the mask 54 is then placed on an X-Y table which is movable in a two-dimensional coordinate plane, along the X and Y axes thereof. Above the X-Y table, there is provided the machining head 24 of the $CO_2$ laser generator as described above by reference to FIG. 1. While the $CO_2$ laser beam is used to remove the inclined end surface 52b and thereby provide the V-groove 52 with a rectangular end portion, other high-energy beams such as a plasma arc or electric arc may be used, provided that such high-energy beams are capable of machining a highly brittle material such as a glass material or $LiNbO_3$ crystal of the substrate 10.

The $CO_2$ laser generator is activated so that a $CO_2$ laser beam is emitted from the machining head 24 toward the substrate 10, in the direction normal to the surface of the substrate 10. Thus, the area including the patterned mask 54 is irradiated with the laser beam. With the laser beam generated, the X-Y table is moved along the X and Y axes so that the mask 54 is scanned by the laser beam from the machining head 24. The laser beam is reflected by the surface of the mask 54, whereby the part of the surface of the substrate 10 covered by the mask 54 is protected from exposure to the laser beam and is not machined. On the other hand, the area of the substrate which is exposed through the rectangular cutout 54a of the mask 54 is irradiated with the laser beam, whereby the inclined end surface 52b of the V-groove 52 is cut by a certain amount due to evaporation of the irradiated material by the energy of the $CO_2$ laser beam. As a result, the V-groove 52 is provided with a rectangular end portion which includes a flat vertical end face 56 perpendicular to the surface of the substrate 10, as indicated in FIG. 18. The end face 56 defines the closed end of the V-groove 52. The machining conditions with the laser beam are indicated in Table 2 below.

TABLE 2

| Laser | $CO_2$ (wavelength: 10.6 microns) |
|---|---|
| Oscillator type | Pulsing type |
| Output | 5-7 W (average value) |
| Irradiation time | 0.1 sec. or less |
| Frequency | 100 Hz |
| Duty cycle | 7% |
| X-Y table feed rate | 0.5 m/min. |

According to the instant method of forming the V-groove 52, the inclined end surface 52b formed as a result of the preliminary cutting of the V-groove 52 by the cutting tool is irradiated with the laser beam, through the cutout 54a of the patterned mask 54, whereby the rectangular void is formed in the closed end portion of the V-groove 52. This void is partly defined by the flat end face 56 perpendicular to the surface of the substrate 10. With the end portion of the optical fiber 14 positioned within the thus formed V-groove 52, the centerline of the fiber 14 is accurately aligned with the waveguide 18 on the substrate 10, by the pair of elongate rectangular side surfaces 52a, 52a which cooperate with each other to form a V shape in transverse cross section. Further, the flat end face 14d of the fiber 14 can be held in close abutting contact with the flat end face 56 of the V-groove 52 which is perpendicular to the surface of the substrate 10, as shown in FIG. 19. Thus, there exists no gap between the end face 14d of the fiber 14 and the waveguide 18, and consequently no optical energy loss occurs at the interface between the fiber 14 and the waveguide 18, assuring high light transmission efficiency of the optical device. As in the preceding embodiments, the end portion of the fiber 14 is secured in the V-groove 52, with a suitable bonding material such as a ultraviolet-curable resin.

While the mask 54 used in the present embodiment is formed of aluminum, other suitable materials such as gold (Au) and silver (Ag) which are capable of reflecting a high-energy light beam may be used for the mask 54. Although the substrate 10 is moved by the X-Y table along the X and Y axes relative to the machining head 24 according to the instant method, the machining head 24 may be adapted to be moved along the X and Y axes, relative to the stationary substrate 10.

It follows from the above description of the embodiment of FIGS. 17-19 that the inclined end surface 52b of the preliminarily cut V-groove 52 is subjected to the high-energy beam through the cutout 54a in the mask 54 formed on the substrate 10. As a result, the V-groove 52 is formed at its closed end with the flat end face 56 which is normal to the surface of the substrate 10, as indicated in FIGS. 18 and 19. This flat end face 56 permits the flat end face 14d of the optical fiber 14 to abut on the exposed portion of the waveguide 18, thereby eliminating the conventionally experienced optical energy loss at the interface between the fiber and the waveguide. Further, the high-energy beam does not adversely affect the irradiated portion of the substrate, but rather contributes to eliminating the residual internal stress of the substrate 10 which may arise during the preliminary machining of the substrate by the cutting tool to form the V-groove 52. Furthermore, the instant method enjoys the advantage of the V-groove 52 for accurate alignment of the fiber 14 with the waveguide 18.

While the present invention has been described in its preferred embodiments with a certain degree of particularity, it is to be understood that the invention is not confined to the precise details of the illustrated embodiments, but may be embodied with various changes, modifications and improvements, which may occur to those skilled in the art, without departing from the spirit and scope of the invention defined in the following claims.

What is claimed is:

1. An optical device comprising:
a substrate having a waveguide formed on a surface thereof for guiding a light beam therethrough;
a buffer layer formed on an area of a surface of said waveguide;
a mask having a cutout and formed on a surface of said buffer layer such that said cutout is aligned with a first part of the surface of said substrate, said mask being formed of a material capable of protecting a second part of the surface of the substrate, which is covered by said mask, from exposure to a high energy beam;
an optical fiber which is optically coupled at one end thereof to said waveguide, said one end of the optical fiber having a flat end face;
said substrate having a groove formed therein by exposure to said high-energy beam through said mask, such that said groove has a substantially flat end face substantially perpendicular to said surface of the substrate; and
fixing means for fixing an end portion of said optical fiber including said substantially flat end face, in said groove, such that said substantially flat end face of said optical fiber is positioned for optical coupling with an exposed portion of said waveguide exposed to said groove, so that said light beam travels from said optical fiber into said waveguide;
said buffer layer functioning to prevent said mask from absorbing an energy of said light beam while said light beam is traveling through said waveguide.

2. An optical device comprising:
a substrate having a waveguide on a surface thereof;
an optical fiber which is optically coupled at one end thereof to said waveguide, said one end of the optical fiber having a coned or hemi-spherical shape;
said substrate having a recessed portion formed therein, said recessed portion having a pair of opposed elongate side surfaces which generally define a V shape in transverse cross section, and an inclined end surface which is inclined such that a length of said side surfaces as measured at a bottom of said recessed portion is smaller than that as measured at said surface of said substrate; and
fixing means for fixing an end portion of said optical fiber including said one end, in said recessed portion, such that said coned or hemi-spherical one end is positioned for optical coupling with an exposed portion of said waveguide exposed to said recessed portion.

3. An optical device according to claim 2, wherein said waveguide is a two-dimensional waveguide.

4. An optical device according to claim 2, wherein said waveguide is a three-dimensional waveguide.

5. An optical device according to claim 2, wherein said recessed portion is open in an end face of said substrate and in one of opposite major surfaces of said substrate, and said coned or hemi-spherical one end of said optical fiber is held by said fixing means in abutting contact with said exposed portion of said waveguide.

6. An optical device according to claim 2, wherein said recessed portion is open only in one of opposite major surfaces of said substrate, and has a curved bottom profile, said end portion of said optical fiber is curved along said curved bottom profile of the recessed portion while said coned or hemi-spherical one end of said optical fiber is held by said fixing means against said inclined end surface of said recessed portion, with a tip of said one end aligned with said exposed portion of said waveguide.

7. An optical device comprising:
a substrate having a waveguide on one of opposite major surfaces thereof;
an optical fiber which is optically coupled at one end thereof to said waveguide;
said substrate having a recessed portion formed in said one of opposite major surfaces thereof, said recessed portion being open only in said one major surface, said recessed portion having a curved bottom profile; and
fixing means for fixing an end portion of said optical fiber including said one end, in said recessed portion open in said one major surface of said substrate, such that said end portion of said optical fiber is curved along said curved bottom profile of the recessed portion while said one end of said optical fiber is positioned for contact with an exposed portion of said waveguide exposed to said recessed portion.

8. An optical device according to claim 7, wherein said one end of said optical fiber has a coned or hemi-spherical shape, and said recessed portion has a pair of opposed elongate side surfaces which generally define a V-shape in transverse cross section, and an inclined end surface which is inclined such that a length of said side surfaces as measured at a bottom of said recessed portion is smaller than that as measured at said surface of said substrate, said fixing means fixing said end portion of said optical fiber such that said coned or hemi-spherical one end is positioned for contact with said inclined end surface of said recessed portion which includes said exposed portion of said waveguide.

* * * * *